June 16, 1964 — H. E. PEARSON — 3,137,095
GARDEN PLANTERS

Filed May 24, 1963 — 2 Sheets-Sheet 1

HAROLD E. PEARSON
INVENTOR.

BY Earl E. Moore
Atty.

June 16, 1964    H. E. PEARSON    3,137,095
GARDEN PLANTERS
Filed May 24, 1963    2 Sheets-Sheet 2
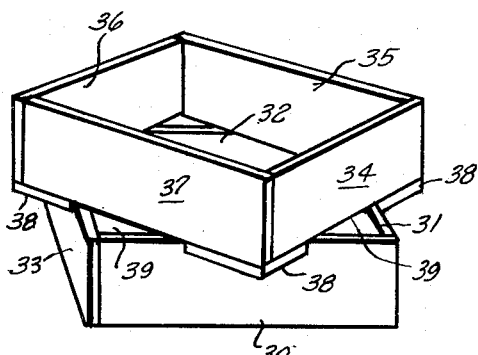
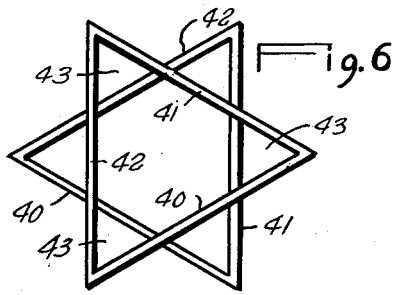
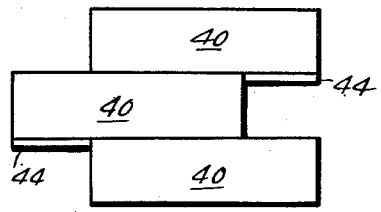
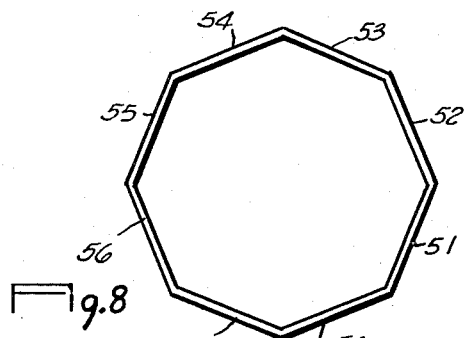
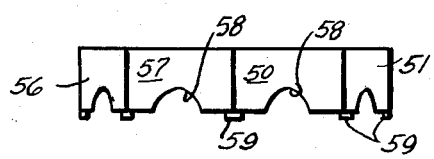
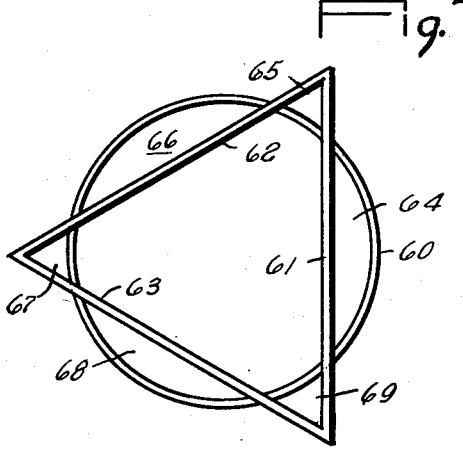
HAROLD E. PEARSON
INVENTOR.
BY

United States Patent Office 3,137,095
Patented June 16, 1964

3,137,095
GARDEN PLANTERS
Harold E. Pearson, Los Angeles County, Calif.
(1409 N. Merced, P.O. Box 310, El Monte, Calif.)
Filed May 24, 1963, Ser. No. 282,922
3 Claims. (Cl. 47—33)

This invention relates to new and novel means and ways for forming vertical type planters and the like that are designed to provide a garden in a small area. The barrel type of planter for strawberries and the like has been known for years, that is, a large barrel is provided with a plurality of holes along its sides and the barrel filled with soil. The strawberry plants were then planted in the soil at each hole.

The planting was started at the bottom holes inside the barrel and it was very hard and difficult to plant as the plants had to be planted from the inside and pulled out through the holes, so as not to bend the roots back in that the plants will not grow satisfactorly if the roots are turned back. This makes it necessary for the person planting in the barrel to lean way over and reach into the inside bottom of the barrel from the top of the barrel and arrange these plants properly by pulling each plant through these holes from the inside of the barrel so as not to bend them back; then the dirt is filled to the second row of holes from the bottom of the barrel and these plants arranged in the aforesaid manner. This procedure is continued until reaching the top of the barrel. This was a back-breaking job, a very tedious one, and difficult to do.

Even irrigation in barrels is very difficult to control. If loose enough soil is used in the barrels so the water will drain through the barrels and wet the plants in the lower portion of the barrel, the plants in the upper portion of the barrel are too dry and will wilt and die as the water runs through too fast; this is particularly so in hot weather.

If heavier soil is used, there is a tendency for the water to drain through too slow causing some of the plants to suffer want of water. If you should accidentially apply too much water in the heavier soil the plants in the lower portion of the barrel get too much water causing many of the plants to become water-logged, thus they rot and die.

Even if a pipe with many small holes and filled with course gravel is installed in the center of the barrel, and course gravel is placed in the bottom of the barrel, it is still impossible to keep the plants evenly watered.

It is almost impossible to replant in barrels as the holes are purposely made small so as to keep the soil from washing out through the holes. If the holes are made large enough to put a garden trowel in so as to replant the soil with new plants, the soil will wash out especially on the lower half of the barrel where it slants inwardly.

The holes in applicant's devices are roomy pockets so that each pocket can be correctly watered by hose, sprinkling can, pitchers, coffee pots, or any other kind of container and with the assurance that each plant is well watered. Obviously, each plant can be properly fertilized in the same manner. If replanting should be necessary, this can be done easily in that the holes and/or pockets are large enough to work a trowel and when plants can be positioned by hand, the roots can be spread properly in that the pockets permit more working room. The planter is made from redwood and will not rot. They can be easily stored and where they are of different size, the smaller ones can be inserted into the larger ones. These planters do not cost as much as barrels when the labor for cleaning, boring etc. is considered. The way the multiple planters are placed on top of each other the holes or pockets are automatically evenly spaced around the multiple container, utilizing all of the available space regardless of size or height of the planter. Obviously, these planters are not limited to the planting of strawberry plants or other fruits and vegetable, but may be used for planting flowers.

One of the important objects of this invention is to provide a planter consisting of a plurality of planter units that can be easily stacked, planted, and maintained with a minimum of effort and expense.

Another object is to provide a planter and the like that is attractive and requires but a minimum of space; thus providing a spacious garden device that can be accommodated in the room of a house, porch, or in a small patio.

Still another object of this invention is to provide planters made of redwood or other non rot or corrosive material that can be neatly stacked and arranged as a thing of beauty and which can be easily kept attractive with a minimum of labor.

Other objects will become apparent upon perusing the specifications and claims.

In the drawings:

FIG. 5 is a perspective view of another form of the invention;

FIG. 6 is still another form of the invention shown in plan view;

FIG. 7 is an elevational view of that shown in FIG. 6;

FIG. 8 is a plan view of still another form of the invention;

FIG. 9 is an elevational view of that shown in FIG. 8;

FIG. 10 is a plan view of still another form of the invention.

Figure 1:
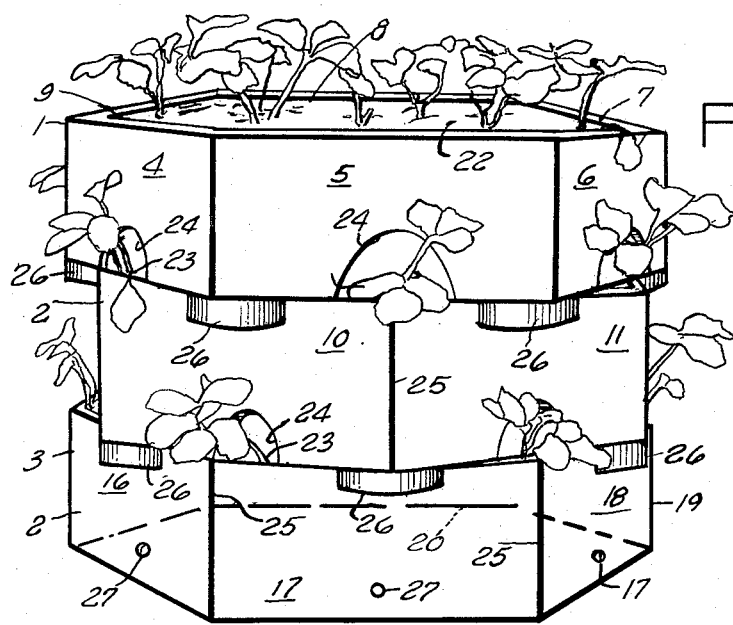
FIG. 1 is a perspective view of a preferred form of the invention showing a planter with strawberry plants in the various pockets thereof.
Figure 2:
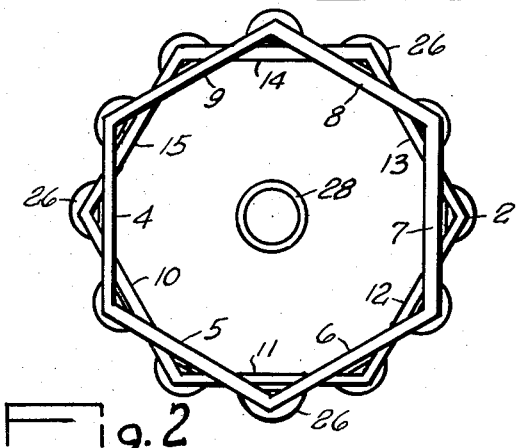
FIG. 2 is a plan view thereof without the plants therein.
Figure 4:
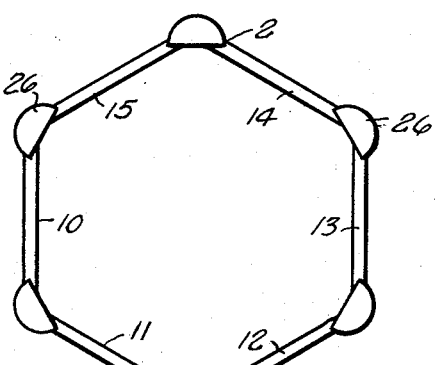
FIG. 4 is an under plan view of just one of the units.
Figure 3:
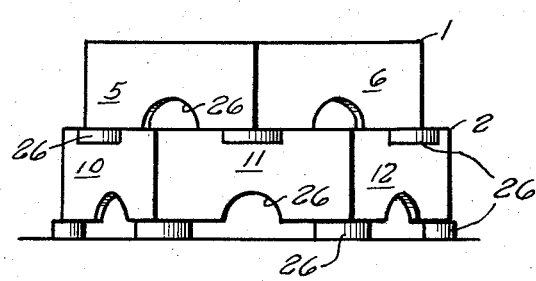
FIG. 3 is an elevational view of that shown in FIG. 2 but showing only the two top tiers thereof.

The preferred form of the invention consists of a plurality of stacked planting units which in this case are numbered 1, 2 and 3. Although but three units are shown, it should be obvious that many more units could be stacked depending upon the wishes of the gardener. The material employed could be most any kind such as wood, metal, concrete, plastics, etc., but when wood, redwood for instance, is employed, reenforcement bands may be used around the units to given them greater strength, however, when only a few of the units are stacked one upon the other, reenforcement would hardly be necessary. When metal is used, the sides may be ribbed and/or the edges beaded to give them greater strength so that the metal sheeting will not have to be too thick and hence too costly. In this particular case, each unit has six sides.

The unit 1 has the sides 4 to 9 inclusive, as shown, unit 2 has the sides 10 to 15 inclusive, and the lowermost of base unit has the sides 16 to 21 inclusive. The uppermost unit has a large soil bed 22 for general planting whereas the other planting areas consist of soil pockets and all of which are indicated in general by the reference character 23, and which are formed in part by the cut-out arched openings 24. The units are so arranged or stacked that the openings 24 are positioned just above the corner portions 25 of the unit below so as to provide a somewhat spacious pocket for the planting of strawberry plants or any other plant desired to be planted.

Below the corner of each unit, the bottom unit may be excepted, there is a guide block or floor element 26 which acts as the floor for its respective pocket. This guide is also a holder so that the various units can be held in their proper position. These floor elements, and the side edges of all the units may be nailed or stapled together or cemented together. But if the units are made of metal, they may be soldered or welded. The floor units 26 may or may not be provided on the bottom units 3, but if provided, they can act as feet to support the planter and thus add to the general beauty of the planter. However, in FIG. 1, the base 3, of the planter is shown without feet, and in this event, each side thereof has a drain hole 27 which is necessary whenever the planter is placed upon some cement slab where the drainage would be very poor. A centrally positioned drain pipe is shown at 28. The pipe may be a perforated one or just a porous one to assure water to all the various beds when the planter is irrigated from the top. However, each pocket can be well watered individually. The kind of soil and manner of treating it is not part of this invention, but it may be well to mention here that in the event the central pipe means 28 is not used, a stack of stones may be arranged through the center for watering and drainage purposes.

Each unit or section like 1, 2 and 3 may have a complete or partial flooring so as to better hold water in the upper portion of each unit or section.

In FIG. 5 the units or sections are rectangular. The base is a square shaped one having the sides 30 to 33 inclusive and placed above it there is the unit having the sides 34 to 37 inclusive. Each corner of each upper unit has a guide block or floor element 38 which provide the plurality of planting pockets 39, as shown. Any number of upper units may be stacked to provide the size of planter desired.

In FIG. 6, each unit has a triangular shape. FIG. 7 shows a stack of three units. Each unit has side walls 40, 41 and 42 and the units are so stacked that the planting pockets 43 are provided. Beneath each pocket there is a floor element or guide block 44. The bottom unit obviously does not need such a floor element.

In FIGS. 8 and 9 a planter is shown having eight side walls numbered 50 to 57 inclusive. Each unit has the arched openings 58 to make a pocket over each corner of the unit beneath. Underneath each corner there is the guide block or floor element 59. These units can be stacked just like the others, however the planting pockets are smaller and to compensate for this, the arched openings are made larger.

FIG. 10 shows another form wherein the base is a round wall and the units above it are triangular in shape. The upper units all have the side walls 61, 62 and 63 and when superimposed, form the plurality of planting pockets 64 to 69 inclusive, as indicated. Each pocket obviously has a guide block or floor element.

Certain novel features and details of this invention are disclosed herein, and in some cases in considerable detail, in order to make the invention clear in at least one form thereof. However, it is to be clearly understood that the invention, as disclosed, is not necessarily limited to the exact form and details disclosed since it is apparent that various modifications and changes may be made without departing from the spirit and scope of the claims of this invention.

Having thus described my invention, what is claimed as new and desired to be secured by Letters Patent is:

I claim:

1. A disassembling type planter and the like comprising a plurality of open top polygonal collar-like units superimposed one above the other to form a shaft, each unit having a plurality of flat sides and a plurality of corner-like parts and wherein each of the corner-like parts has a floor, each of said floors protruding beneath its corner-like part to form a guide, the guides of each unit engaging the flat side of the unit below it, and wherein the corner-like parts and their respective floors form a plurality of spaced apart planting beds for gardening purposes.

2. The planter recited in claim 1 wherein each flat side wall of each unit has a large opening along its bottom edge positioned just over the corner-like part of the unit beneath it to form extra large planting bed areas.

3. A planter device having a plurality of units and each having a plurality of flat side walls joined together to form corner planting beds, the plurality of the units having open tops, the units forming a shaft when superimposed one above the other with their corner planting beds extended to form pockets, a floor under each pocket and wherein the floor of each pocket protrudes to form a guide which engages the flat side wall of the unit beneath it and which guides serve the purposes of allowing the units to be neatly stacked so all the pockets form a series of vertical alinements.

References Cited in the file of this patent

UNITED STATES PATENTS

| | | |
|---|---|---|
| 197,406 | Reinecke | Nov. 20, 1877 |
| 262,335 | Wagner | Aug. 8, 1882 |
| 440,141 | Dearborn | Nov. 11, 1890 |
| 2,670,571 | Waldron | Mar. 2, 1954 |
| 2,837,866 | Esmay et al. | June 10, 1958 |
| 3,073,061 | Pearson | Jan. 15, 1963 |

FOREIGN PATENTS

| | | |
|---|---|---|
| 231,444 | Switzerland | June 16, 1944 |